(12) United States Patent
Nascimben et al.

(10) Patent No.: US 12,599,999 B2
(45) Date of Patent: Apr. 14, 2026

(54) PROCESSING MACHINE AND PROCESSING METHOD

(71) Applicant: MULTIAX INTERNATIONAL CNC S.R.L., Brugnera (IT)

(72) Inventors: Marco Nascimben, Brugnera (IT); Eros Zadro, Brugnera (IT)

(*) Notice: Subject to any disclaimer, the term of this patent is extended or adjusted under 35 U.S.C. 154(b) by 816 days.

(21) Appl. No.: 17/905,208

(22) PCT Filed: Feb. 26, 2021

(86) PCT No.: PCT/EP2021/000022
§ 371 (c)(1),
(2) Date: Aug. 29, 2022

(87) PCT Pub. No.: WO2021/170289
PCT Pub. Date: Sep. 2, 2021

(65) Prior Publication Data
US 2023/0137361 A1 May 4, 2023

(30) Foreign Application Priority Data
Feb. 28, 2020 (IT) ......................... 102020000004177

(51) Int. Cl.
*B23Q 7/04* (2006.01)
*B23Q 1/01* (2006.01)

(52) U.S. Cl.
CPC ............. *B23Q 7/046* (2013.01); *B23Q 1/012* (2013.01); *B23Q 1/017* (2013.01);
(Continued)

(58) Field of Classification Search
CPC ........ B23Q 1/012; B23Q 1/017; B23Q 7/045; B23Q 7/046; Y10T 29/5112;
(Continued)

(56) References Cited

U.S. PATENT DOCUMENTS 3,564,971 A * 2/1971 Wagner .................. B23Q 23/00
409/212
3,613,502 A * 10/1971 Wagner .................... B23B 3/10
409/235
(Continued)

FOREIGN PATENT DOCUMENTS

DE 102009025009 A1 12/2010
EP 1637279 A1 * 3/2006 ............. B23Q 7/045
(Continued)

OTHER PUBLICATIONS

International Search Report for corresponding PCT/EP2021/000022, dated May 28, 2021.
(Continued)

*Primary Examiner* — Sunil K Singh
*Assistant Examiner* — Michael Vitale
(74) *Attorney, Agent, or Firm* — Egbert, McDaniel & Swartz, PLLC

(57) ABSTRACT

Processing machine and related operating method, wherein the processing machine is a machine for machining components having a body within which there are a chamber and a movement bridge which is movable on the upper part of the chamber, wherein the processing machine includes a positioning device integrated in the structure of the bridge and equipped with grabbing devices for the grabbing of the element to be machined and for the transportation of the element to be machined towards and from a machining bench of the machine.

23 Claims, 13 Drawing Sheets

(52) U.S. Cl.
CPC .. *Y10T 29/5112* (2015.01); *Y10T 409/307728* (2015.01); *Y10T 409/308288* (2015.01); *Y10T 409/309632* (2015.01)

(58) Field of Classification Search
CPC ... Y10T 409/30392; Y10T 409/307728; Y10T 409/308288; Y10T 409/309576; Y10T 409/309632; Y10T 483/16
USPC .......... 409/134, 202, 212, 235, 236; 483/14; 29/27 A
See application file for complete search history.

(56) References Cited

U.S. PATENT DOCUMENTS

| | | | | |
|---|---|---|---|---|
| 3,945,750 | A * | 3/1976 | Malot | B23B 29/02 |
| | | | | 408/117 |
| 4,706,371 | A * | 11/1987 | McMurtry | B23Q 7/04 |
| | | | | 483/66 |
| 6,457,919 | B1 * | 10/2002 | Sangster | B23Q 1/012 |
| | | | | 409/203 |
| 8,659,763 | B2 * | 2/2014 | Kahle | G05B 19/401 |
| | | | | 356/498 |
| 10,363,644 | B2 * | 7/2019 | Parpajola | B23Q 11/0891 |
| 11,911,860 | B2 * | 2/2024 | Parpajola | G05B 19/404 |
| 2002/0006764 | A1 * | 1/2002 | Hanisch | B23Q 1/52 |
| | | | | 451/1 |
| 2002/0077052 | A1 * | 6/2002 | Grund | B23Q 11/0816 |
| | | | | 451/451 |
| 2006/0291971 | A1 * | 12/2006 | Tanoue | B23Q 1/626 |
| | | | | 409/202 |
| 2007/0015645 | A1 * | 1/2007 | Hale | A63B 21/4015 |
| | | | | 482/142 |
| 2016/0207157 | A1 * | 7/2016 | Corletto | G01B 5/012 |

FOREIGN PATENT DOCUMENTS

| | | | | |
|---|---|---|---|---|
| EP | 2392439 | A1 | 12/2011 | |
| EP | 2660023 | A2 | 11/2013 | |
| KR | 101079281 | B1 * | 11/2011 | B23Q 1/012 |

OTHER PUBLICATIONS

Written Opinion of the International Searching Authority for corresponding PCT/EP2021/000022, dated May 28, 2021.
International Preliminary Report on Patentability for corresponding PCT/EP2021/000022, dated Jul. 6, 2022.

* cited by examiner

Det. M

Det. N

PROCESSING MACHINE AND PROCESSING METHOD

TECHNICAL FIELD

The present invention relates to a machine for machining elements to be machined by means of a machining head and a processing method based on that machine.

PRIOR ART

In the field of machining elements to be machined by means of a machining head, which is programmed by means of numerical control systems, it is known the use of processing machines provided with a machining chamber with suction systems to prevent dust dispersion. Into the machining chamber there is a machining bench on which the element to be machined is placed in order to be arranged in a machining zone within which the machining head is moved to carry out the programmed processing by means of tools supported by the same machining head.

In particular, for what concerns the elements to be machined with tubular shape, it is known the use of machining benches equipped with axially rotating supports creating a machining lathe which can rotate the tubular element to be machined around its axis while the machining head carries out a corresponding process on the tubular element to be machined in rotation on the lathe.

Furthermore, systems for charging and discharging elements to be machined on machining benches are known, which are separate systems with respect to the machine such as for example, systems based on overhead cranes of the production plant in which the processing machine is placed, or based on the use of handling forklifts.

The application EP 2 660 023 describes a method and a machine for the processing of wood components or the like. The machine is equipped with an elongated base, with at least one locking device for locking a component to be machined on the base, with a crane which is movable along the base and with a station for charging and discharging a plurality of components to be machined. Each component to be machined is transferred between the charging and discharging station and the locking device by means of two grabbing and positioning devices which are respectively mounted on the movable crane and in the charging and discharging station for the movement. The grabbing devices in the charging and discharging station are movable by means of a movement system on a guide, which is a separate and independent guide with respect to the guiding systems of the crane supporting the machining heads. The grabbing devices are made in the form of air suction means. The application EP 2 392 439 describes a method and a machine for machining wood components or the like, in particular components for frames. The machine is equipped with a plurality of clamping vices suitable for receiving and retaining at least one component to be machined, and of two movable bridge cranes having respectively operating heads suitable for simultaneously making respective processes on at least one component to be machined. The components to be machined are charged on supporting elements on the same base supporting the movable bridges. One of the two bridges acts both as charging device and as machining device by means of replacement of the tools with locking vices of the component to be machined.

The application DE 10 2009 025009 describes a machine-tool for machining metallic pieces. The machine is equipped with a mandrel for mounting a tool and with a positioning unit of the piece to be machined. The tool is movable on three axes on a wide processing zone thanks to the presence of supporting protrusions overhanging with respect to the side-walls and to the body of the machine. The positioning unit of the machining piece is a bridge equipped with a rotary table and with drives of the bridge.

The application EP 1 637 279 describes a machining apparatus with gripping tool on the machining head. The apparatus includes a base, a processing table and a processing head bearing a motorized spindle. The machining table and the machining head are supported on the base in a reciprocally sliding relation along at least a horizontal direction and a vertical direction. A gripping tool is equipped with at least one gripper operated for opening and closing by operating means. The gripping tool can be operated by the machining head to cyclically convey pieces from a charging zone to the machining table and from the machining table to a discharging area. The gripping tool is mounted on the machining head instead of the tools intended for charging and discharging operations. The machine provides a tooling phase with the gripping tool, a movement phase for the movement of the elements to be machined, a replacement phase for replacing the gripping tool with a machining tool, a machining phase, a replacement phase for replacing the machining tool with the gripping tool, a discharging phase for discharging the machined products.

Problems of the Prior Art

With reference to machines for machining elements to be machined, in particular large-sized elements to be machined, charging operations made by means of separated systems with respect to the machine involve many problems.

Precisely, in order to allow the access to such systems to the machining zone to perform the positioning of the element to be machined on the machining bench, it is necessary to provide the machine with access systems which can allow the provided movement of the element to be machined. For example, in case bridge cranes are used, the machine must be openable on the upper part so to allow that the element to be machined is lowered from the above on the machining bench and, at the same time, the processing machine must be closable on the upper part in order to obtain a closed machining chamber with the aim of letting the suction systems to be effective in order to avoid the dispersion of the dust generated during the processes made by the machining head. These requirements make the processing machine complicated and make the dust containment more difficult. Furthermore, since the charging and discharging systems based on bridge crane are not very precise and involve also oscillations of the element to be machined during its movement, the opening of the machine for charging and discharging operations must be much more bigger than the size of the element to be machined, further to this aspect, it is necessary to build much more bigger processing machines than the minimum size that would be required for the machining chamber capacity and the size of the corresponding machining bench. Such aspects, not only have consequences from the economical point of view with reference to the machine cost, but also from the logistic point of view, because the whole production plant must be suitable for installing a machine of great sizes. Moreover, the movement of elements to be machined, in particular of large-sized elements, must occur slowly in order to avoid oscillations, this aspect has important consequences on charging and discharging times, that is a downtime during which the machine does not carry out processes and having, therefore, important consequences also from the economical point of view, because the processing machine is not completely exploited with respect to its machining capacities for time unit.

Even charging systems based on the use of forklifts have the same problems, because the movement of large-sized elements to be machined by means of a forklift is particularly problematic due to side measurements in case of elements to be machined in tubular or also in plates shape, in general, of elements with polygonal or circular section internally hollow or full, of great length, with the consequence that even in this case charging and discharging operations of the element to be machined are subject to the same problems previously described. Although in case forklifts are used instead of bridge cranes, it is necessary to provide the charging and discharging from the above, it is necessary to consider that, however, forklifts must lift the elements to be machined in order to be charged on the machining bench; therefore it is necessary that the processing machine is high enough to allow said lifting, also considering the sizes of the lifting systems of the forks of the forklift. The main problem with reference to the great sizes of the processing machines according to the prior art, which are equipped with external charging systems as those described, relates to the precision of the machine. Actually, since the processes are carried out by means of numerically controlled systems which need a very precise control of the position of the machining head, the increase in the sizes of the machine may be such to cause clearances, vibrations, deformations of the structure which may reduce the precision of the processes that can be carried out, causing therefore problems particularly in the realization of numerically controlled processing machines for carrying out highly precise processes on large elements to be machined such as, for example, tubular elements having a very big diameter and of great length or also elements to be machined in the shape of plates or, in general, elements with polygonal or circular section internally hollow or full, having very big and very long sectional sizes.

Aim of the Invention

Aim of the present invention is to supply a machine for machining elements to be machined by means of a machining head and a processing method based on this machine allowing to obtain fast and precise charging and discharging operations.

Concept of the Invention

The aim of the invention is achieved by the characteristics of the main claim. The sub-claims represent advantageous solutions.

Advantageous Effects of the Invention

The solution in compliance with the present invention, through its considerable creative contribution, the effect of which constitutes immediate and non-negligible technical progress, has various advantages.

The machine realized according to the present invention is advantageously more compact with respect to the machines of the prior art.

Besides obtaining faster and more precise charging and discharging operations, the machine and the relative inventive method, also allow the execution of precise processes on the element to be machined by means of the machining head controlled by means of numerically controlled systems.

Furthermore, it is improved the efficiency of the machine intended as a ratio between the operative time of the machine when it carries out the provided machining and the total time comprising charging and discharging time of element to be machined on the machine.

DESCRIPTION OF THE DRAWINGS

Hereinafter a solution is described with reference to the enclosed drawings, which are to be considered as a non-limiting example of the present invention, in which.

DESCRIPTION OF THE INVENTION

The present invention relates to (FIG. 1, FIG. 2, FIG. 3, FIG. 4, FIG. 5) a processing machine (1) for the machining of elements to be machined (7) by means of a machining head (26) and a processing method based on this processing machine (1).

Figure 1:
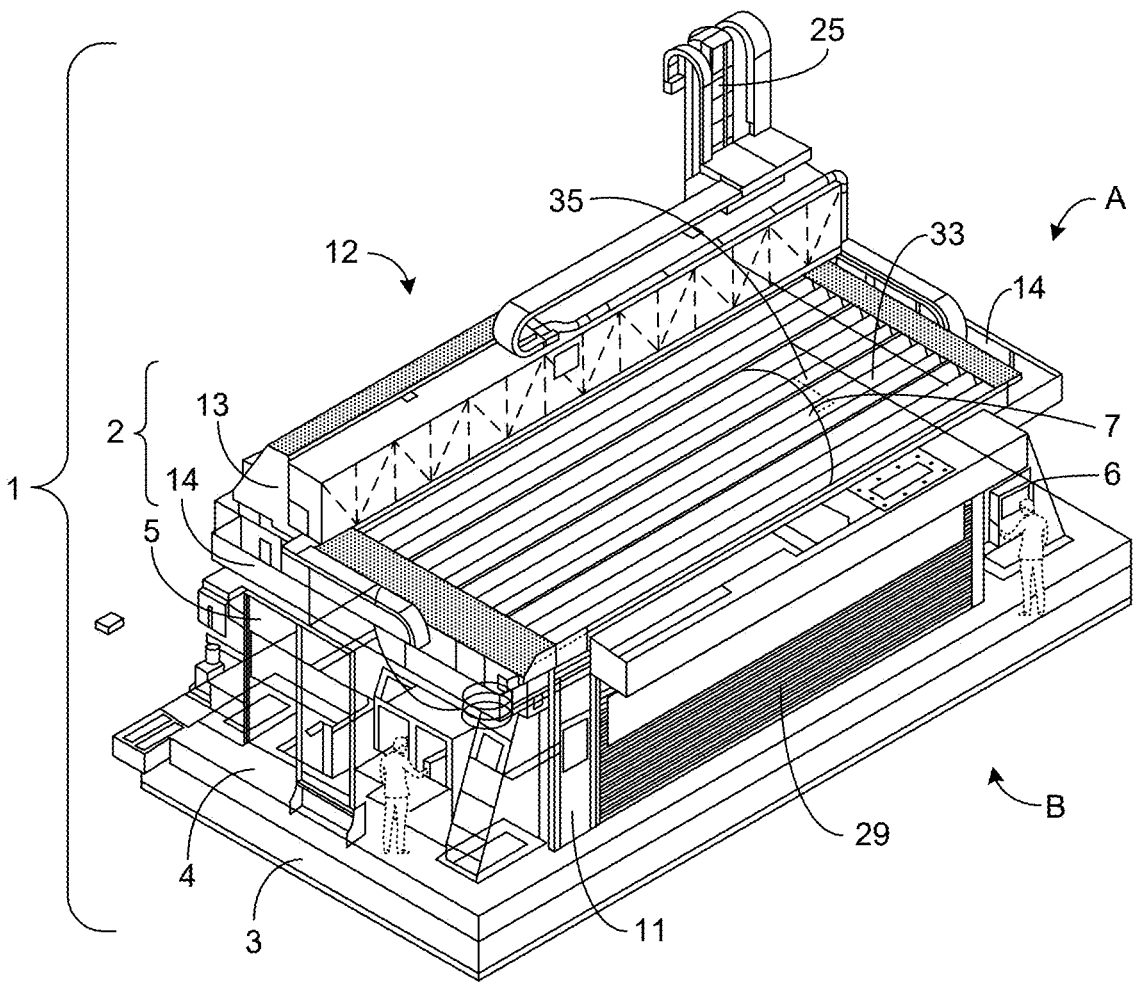
FIG. 1 is a perspective view of the inventive machine.
Figure 2:
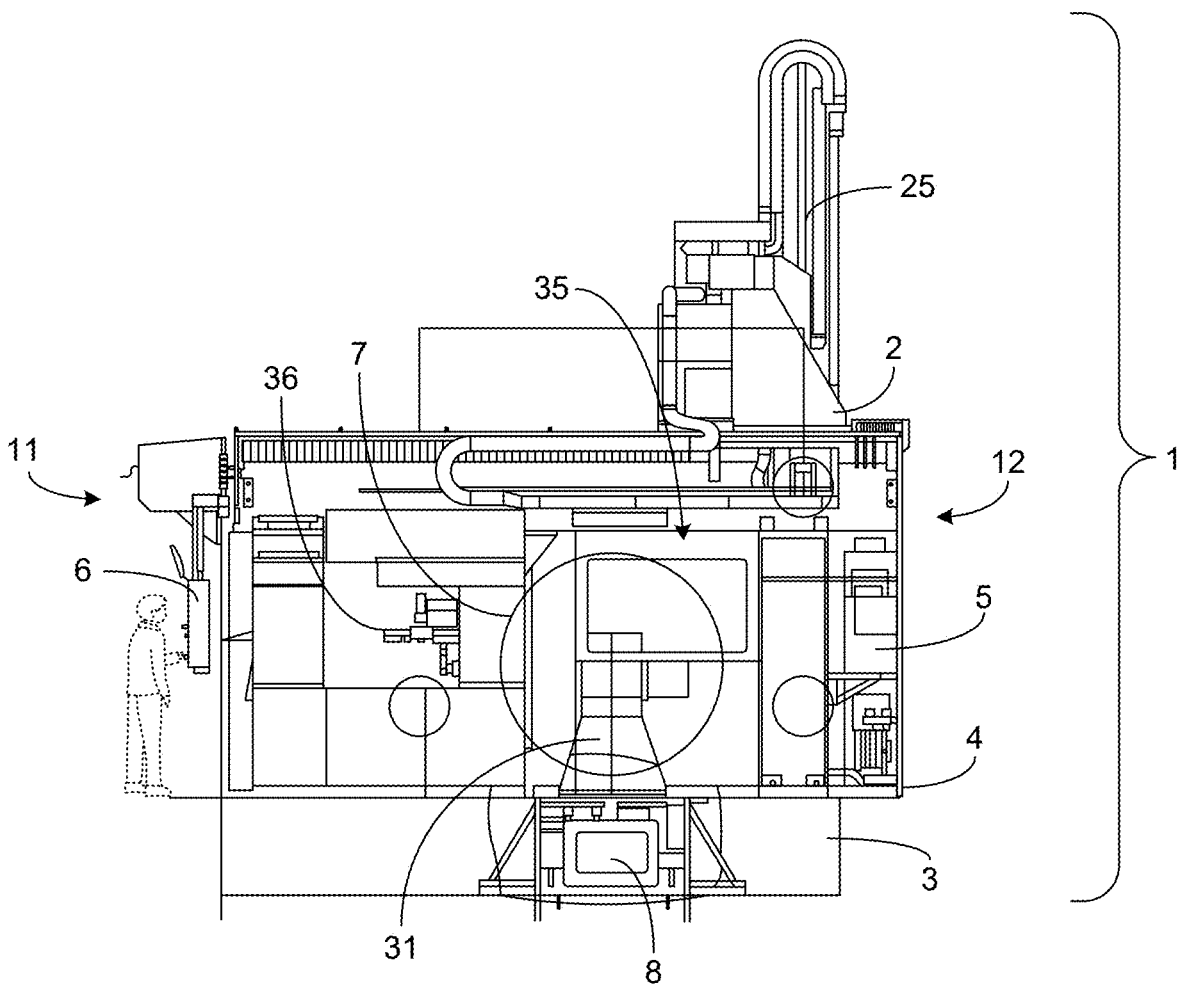
FIG. 2 is a view of the machine of FIG. 1, according to the view indicated with letter A in FIG. 1.
Figure 3:
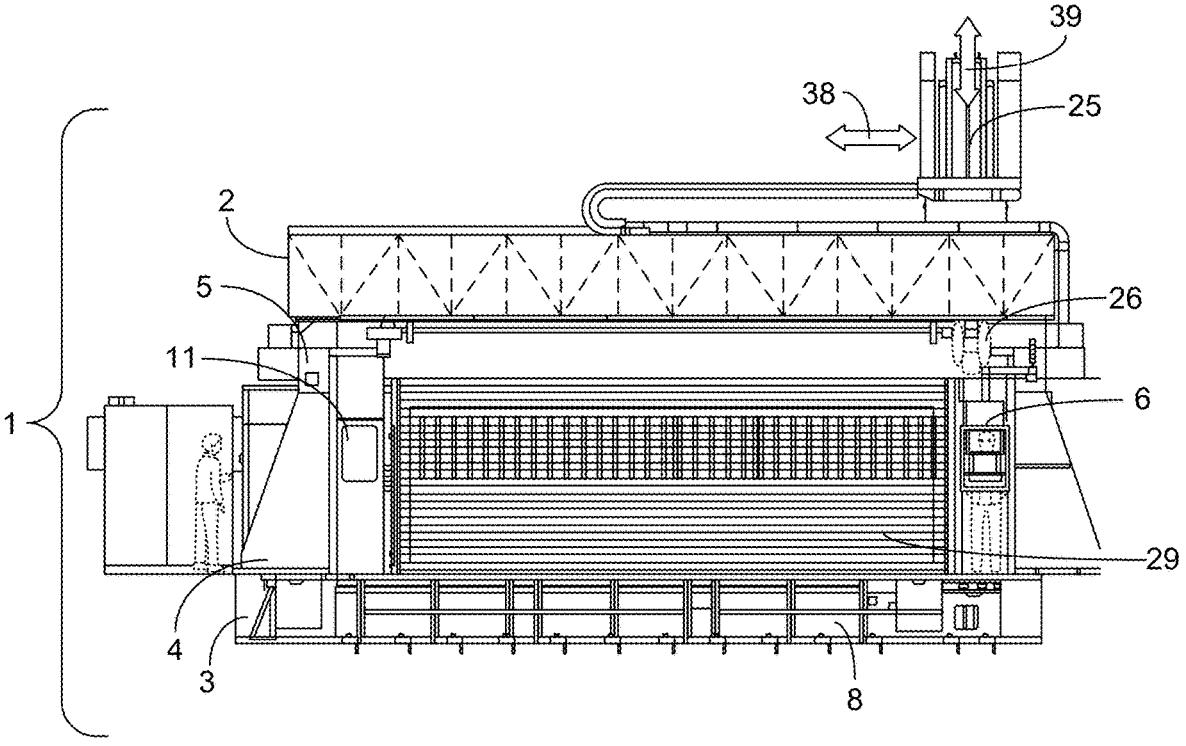
FIG. 3 is a view of the machine of FIG. 1, according to the view indicated with letter B in FIG. 1.
Figure 4:
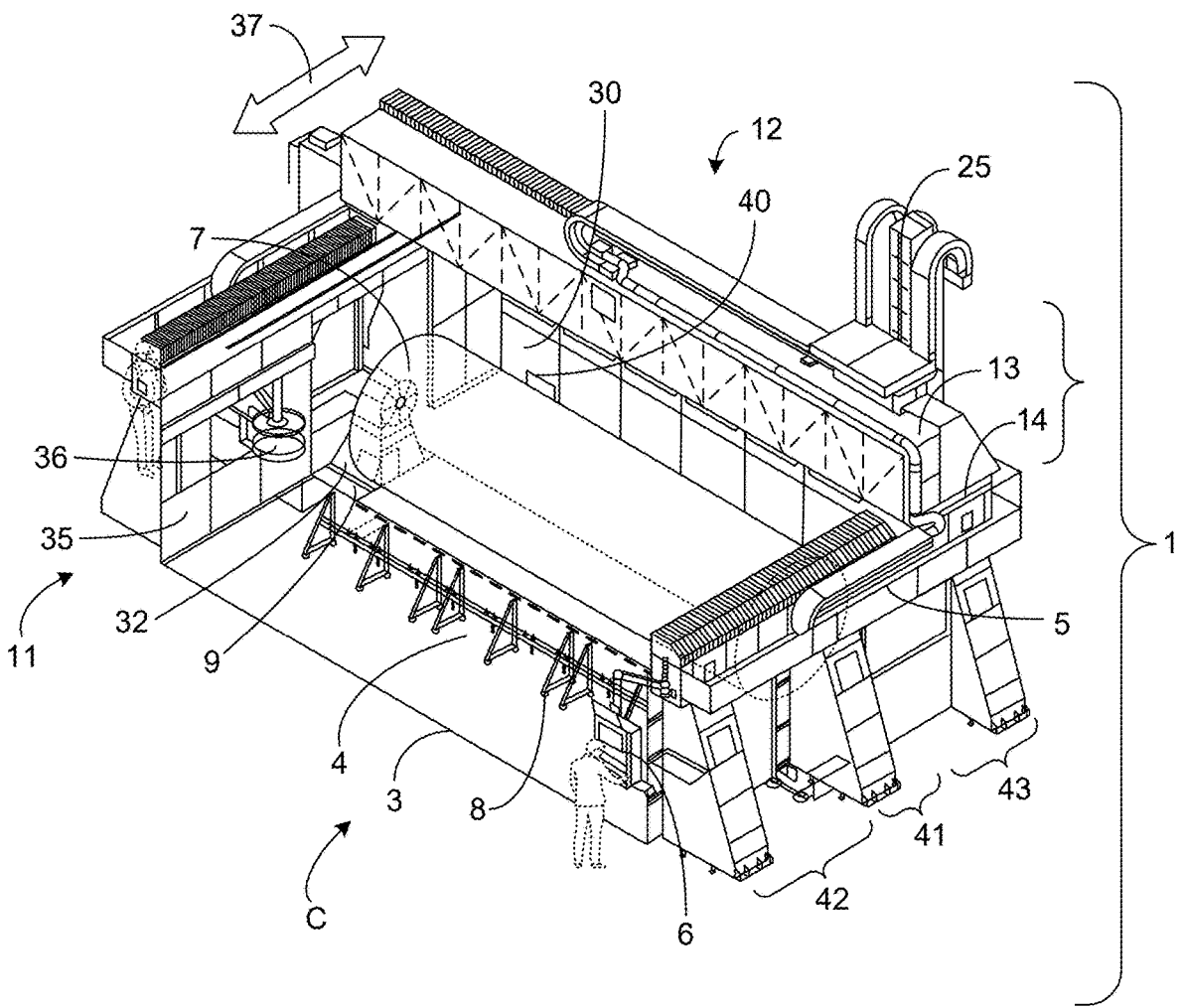
FIG. 4 is a view of the machine of FIG. 1, wherein the upper cover and the cover of a first access side for accessing the internal chamber of the machine have been removed.
Figure 5:
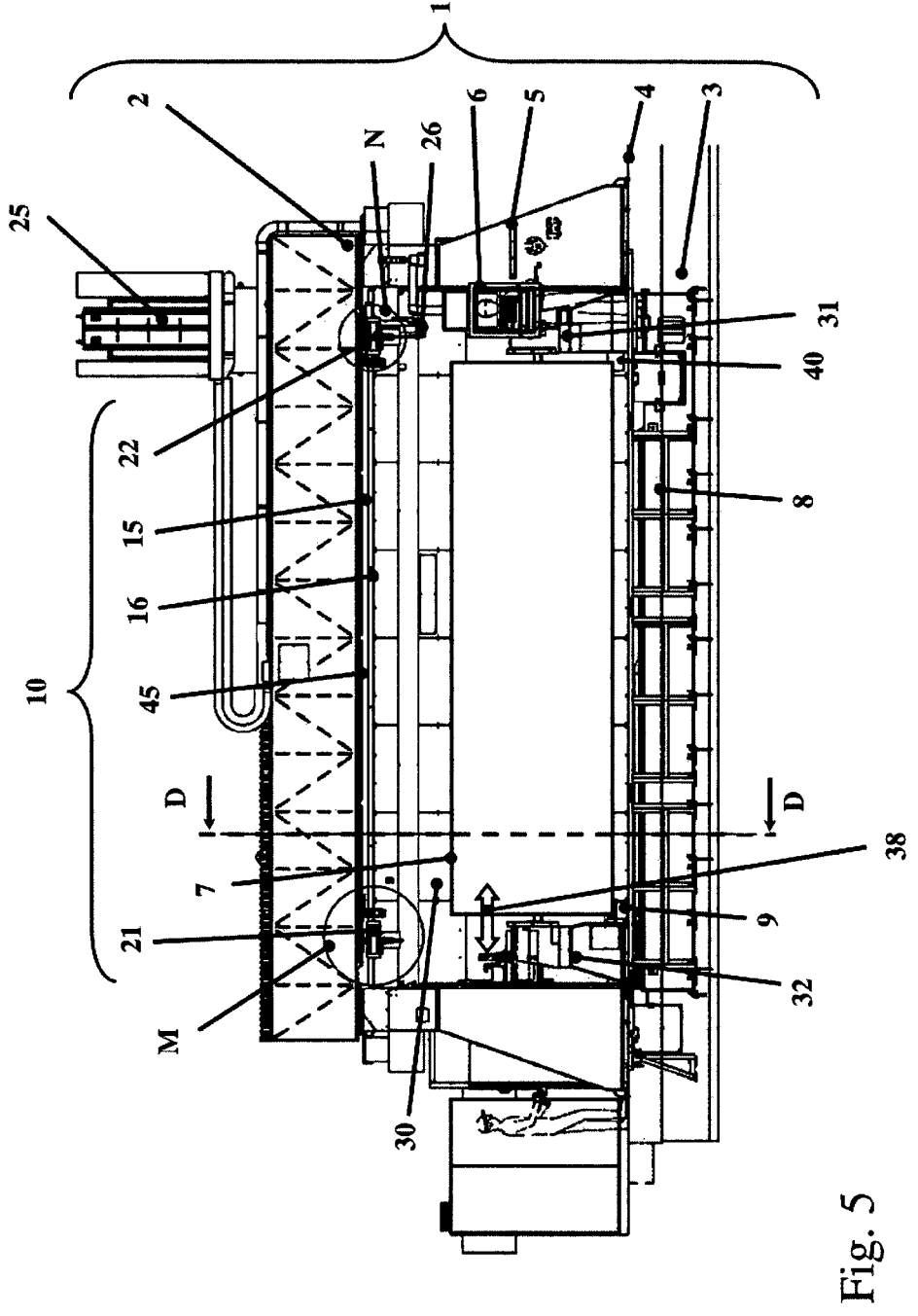
FIG. 5 is a view of the machine of FIG. 4, according to the view indicated with letter C in FIG. 4.

The processing machine (1) comprises a body (5) of the machine defining inside it a chamber (35) within which occurs the machining. The machining chamber (35) is (FIG. 1, FIG. 2, FIG. 4) a space inside the machine (1), which has essentially a parallelepiped shape delimited by the surface of the ground (4), a cover (29) of a first side of the machine, a cover (30) of a second side of the machine, an upper cover of the machine (33, 34) and side walls. The machining head (26) is suitable for carrying out processes by means of tools on one element to be machined (7), which is placed (FIG. 4, FIG. 5) on a bench (9) supported by a base (8). The bench (9) includes a first support (31) and a second support (32), which are placed at opposite ends of the bench (9) to support the element to be machined (7) at the ends. The supports (31, 32) support the element to be machined (7) at the ends. In some embodiments the supports (31, 32) are equipped with a rotational system of the element to be machined (7) around a rotation axis parallel to the width development axis of the bench, realizing a machining lathe, which is placed (FIG. 4)

in a first zone (41) for machining the processing machine (1). However, it will be evident that, in general, the bench (9) can be a bench equipped with supports (31, 32) which are not necessarily made in the form of a lathe, but which may be generic supports that support the elements to be machined (7) of any sectional form, internally hollow or internally full. With reference to the bench (9), at least one of the two supports (31, 32), selected between the first support (31) and the second support (32), is transversely movable (FIG. 5) along the width development axis of the bench according to an approach or departing direction with respect to the other of the two supports (31, 32), in order to allow an increase of the space between the first support (31) and the second support (32) during the positioning and removal operations of the element to be machined (7) and a decrease of the space with locking action of the element to be machined (7) in the provided position of machining on the bench (9). In the preferred embodiment of the present invention, one of the two supports is fixed and the other is movable, but it will be evident that solutions in which both supports are movable can also be provided. For example, it can be provided that the first support (31) is fixed and that the second support (32) is movable along the bench. In the preferred embodiment of the present invention, therefore, the element to be machined (7) is placed on the upper part of the bench (9) in a position comprised between the first support (31) and the second support (32) when the second support (32) is in the departing condition, so that the movements of the element to be machined (7) may not cause impacts with the supports (31, 32). Once the element to be machined (7) is correctly placed between the supports (31, 32), the element to be machined (7) is moved in such way to come into contact with the first support (31) which is fixed, so as to obtain a hooking condition between a first engagement end of the element to be machined (7) and a coupling system with automatic centring and locking which is on the first support (31). Moreover, the second support (32) is moved in approach direction towards the first support, in such a way to come into contact with the element to be machined (7), so as to obtain a hooking condition between a second engagement end of the element to be machined (7) and a coupling system with automatic centring and locking which is on the second support (32).

Furthermore, the processing machine (1) is equipped with a second zone (42) constituting a front access area of the processing machine (1), the function of which will be explained in detail in the following part of the present description. A third zone (43) constitutes a back-access area of the processing machine (1).

In some embodiments, the second zone (42) of the machine (1), that is the charging zone of the element to be machined (7), is furthermore a discharging zone of the element to be machined by the machine (1) and, in that case, the third zone (43) can be intended to be a parking zone of the machining head (26), the first zone for machining (41) and the second zone of (42) and the parking zone transversely developing across along the X axis (38) of the machine and being placed one after the other according to a configuration in which the first machining zone (41) is placed between the second zone (42) and the parking zone along the Y axis (37) of the machine. The parking area of the machining head (26) can be used to maintain the machining head in protected position during the predisposition operations for charging the element to be machined (7) on the bench (9) and for maintenance operations.

Figure 19:
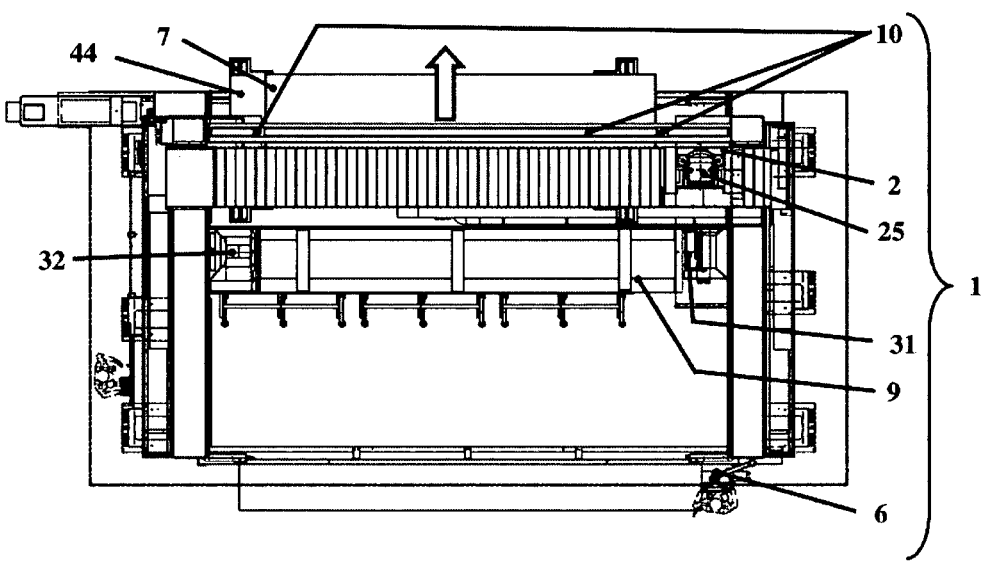
FIG. 19 shows a different embodiment of the inventive machine in the form of passing-through processing machine.

In other embodiments (FIG. 19), the machine includes a third zone (43), the first machining zone (41) and the second zone (42) and the third zone (43) transversely developing across along the X axis (38) of the machine and being placed one after the other according to a configuration in which the first machining zone (41) is placed between the second zone (42) and the third zone (43) along the Y axis (37) of the machine, the third zone (43) constituting an unloading zone of element to be machined for unloading of the element to be machined (7) from the machine (1), the second zone (42) for charging and the third zone (43) for unloading being placed at opposite sides with respect to the first zone (41) for machining, in such a way that the machine (1) constitutes a pass-through machine for loading the elements to be machined (7) from a loading side and for unloading the elements to be machined (7) from the opposite side with respect to the loading side. This solution is particularly advantageous in case the processing machine is part of a processing line or of a processing and assembly line, wherein on the elements to be machined, different operations are carried out by processing machines placed one after the other on the processing line.

The processing machine (1) is equipped with upper covers (33, 34) and with side covers (29, 30) in order to make the chamber (35) a closed environment and the processing machine (1) is further equipped (FIG. 4, FIG. 5) with suction inlet (40) connected to a suction, filtering and collection system for machining dust produced during the machining phases of the element to be machined (7). In particular, on a first front side (11) of the processing machine (1) there is a cover of the first side (29) which is openable and closable to allow the access to the second zone (42), while on a second back side (12) of the processing machine (1) there may be a cover of the second side (30), which is openable and closable to allow the access to the third zone (43).

Figure 6:
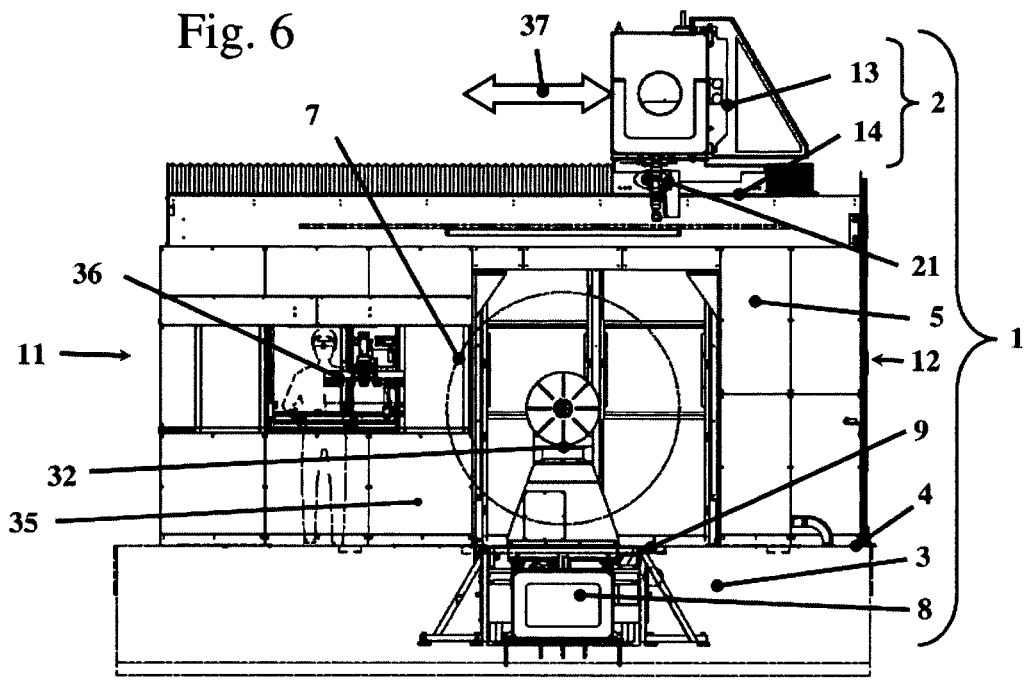
FIG. 6 is a view of the machine of FIG. 4, according to section D-D of FIG. 4.
Figure 7:
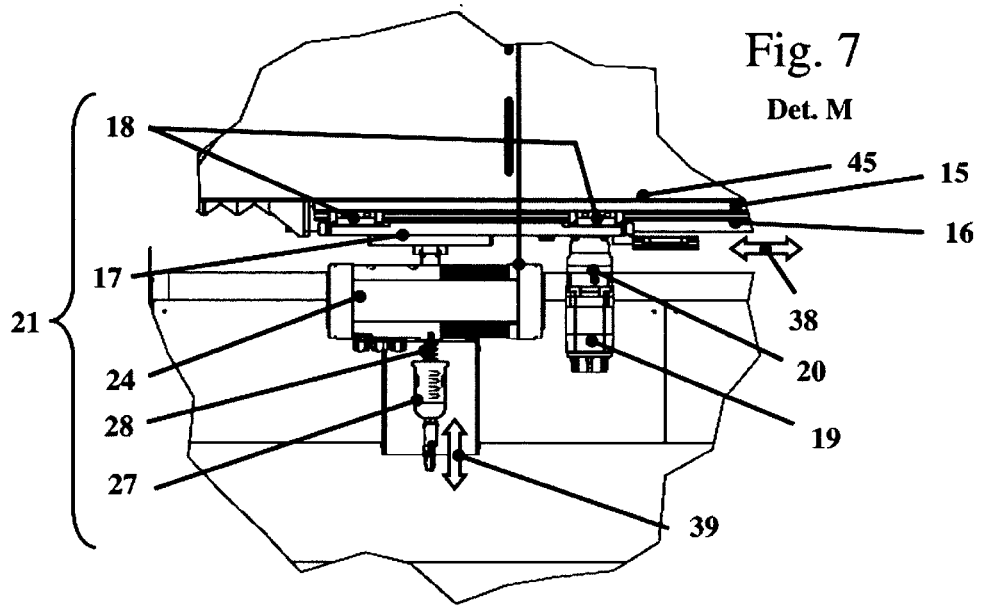
FIG. 7 is an enlarged view of the particular indicated with letter M in FIG. 4.
Figure 8:
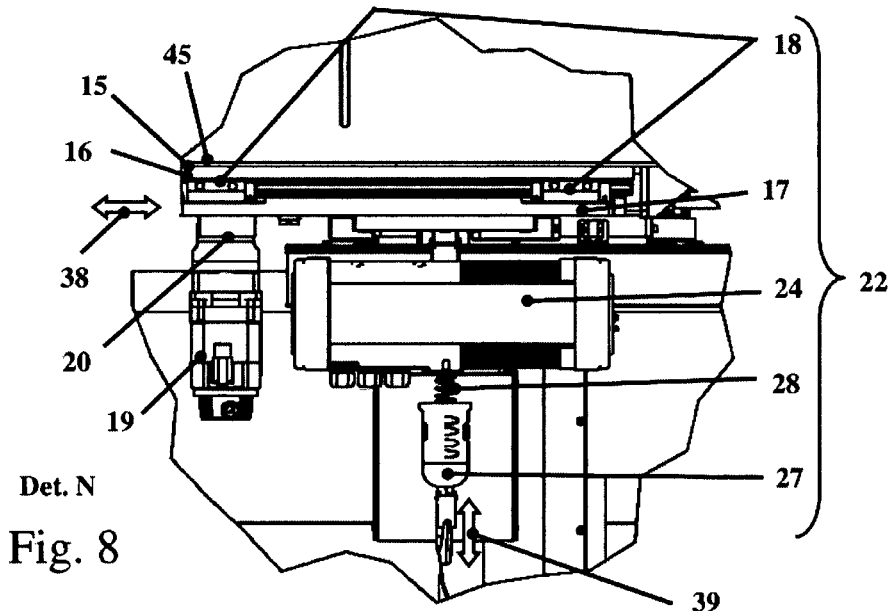
FIG. 8 is an enlarged view of the particular indicated with letter N in FIG. 4.
Figure 9:
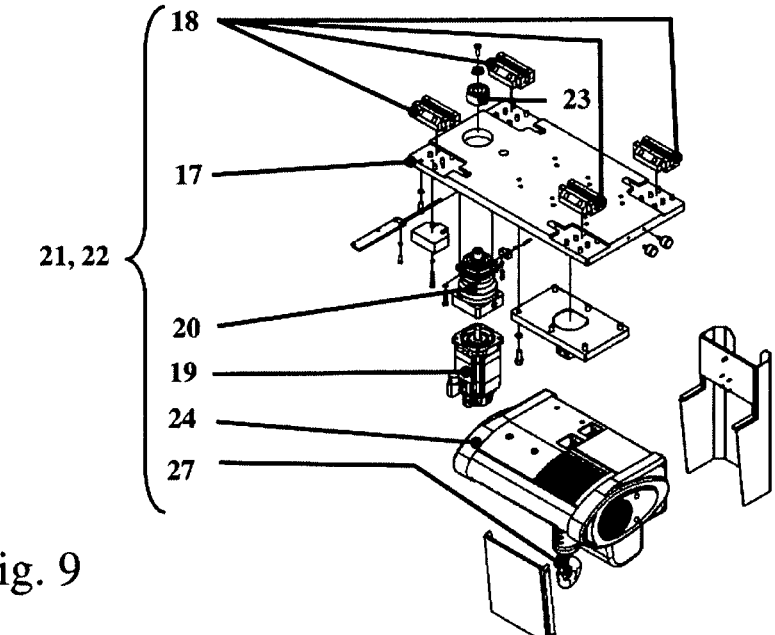
FIG. 9 is an exploded view of a grabbing device of the inventive machine.
Figure 10:
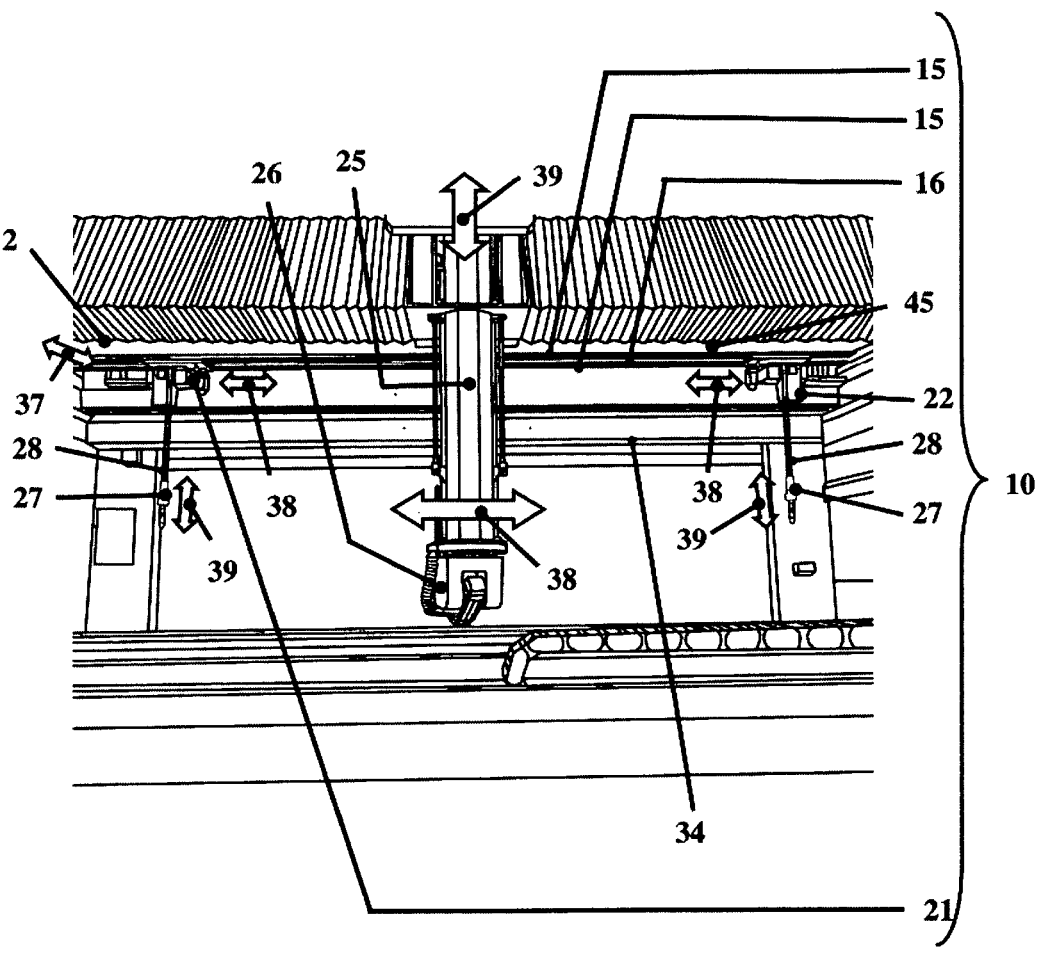
FIG. 10 is a perspective view of a part of the chamber of the inventive machine.
Figure 11:
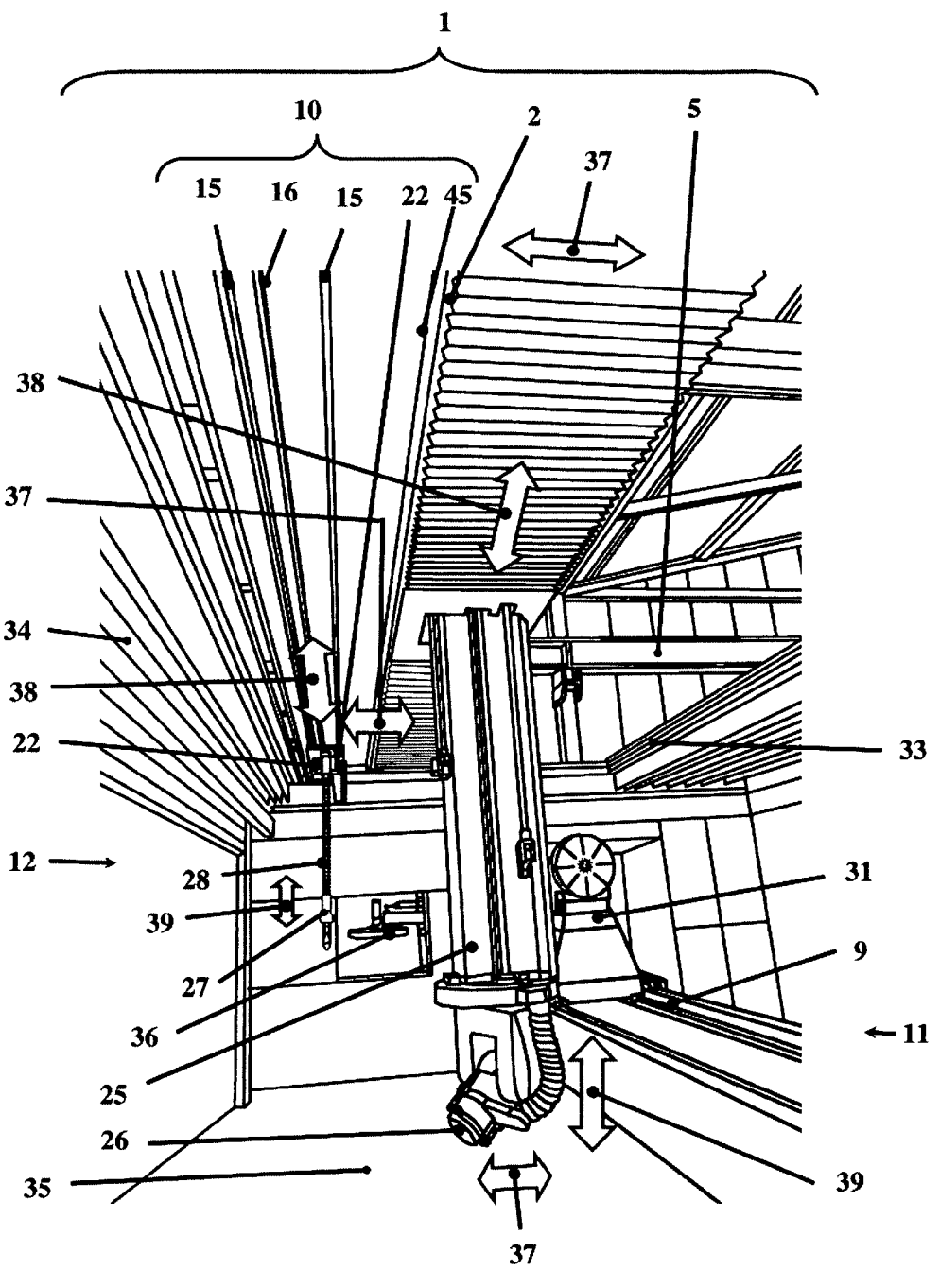
FIG. 11 is a perspective view of a part of the chamber of the inventive machine.
Figure 12:
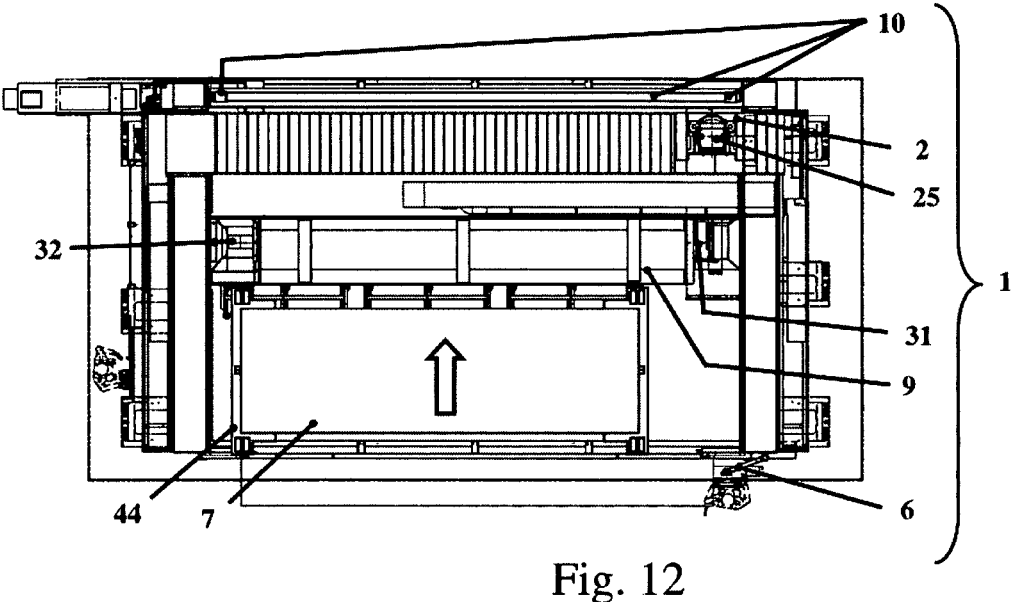
FIG. 12, FIG. 13, FIG. 14, FIG. 15, FIG. 16, FIG. 17 are schematic views of the inventive machine showing a charging sequence.
Figure 13:
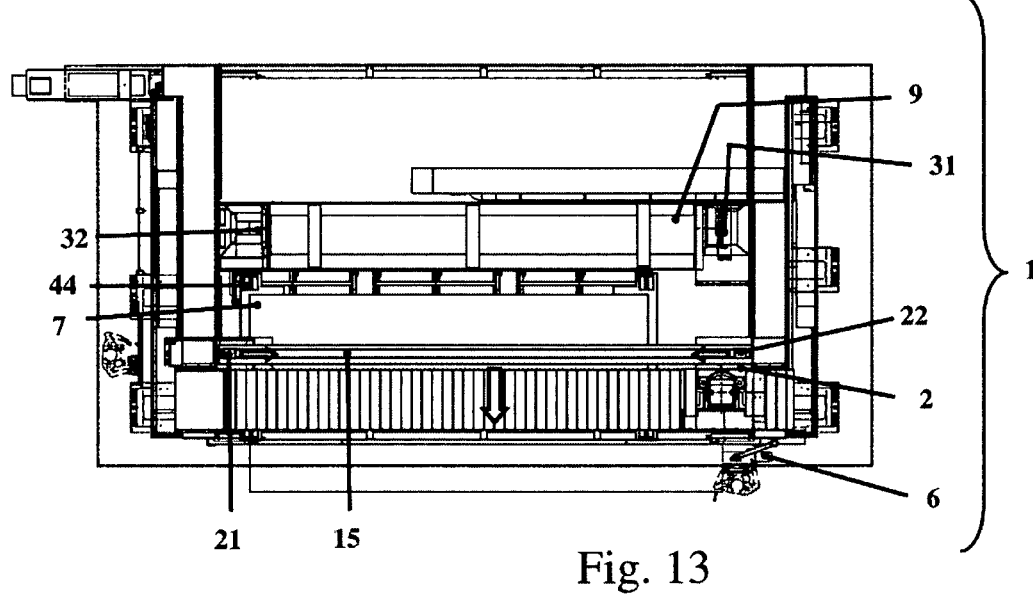
Figure 14:
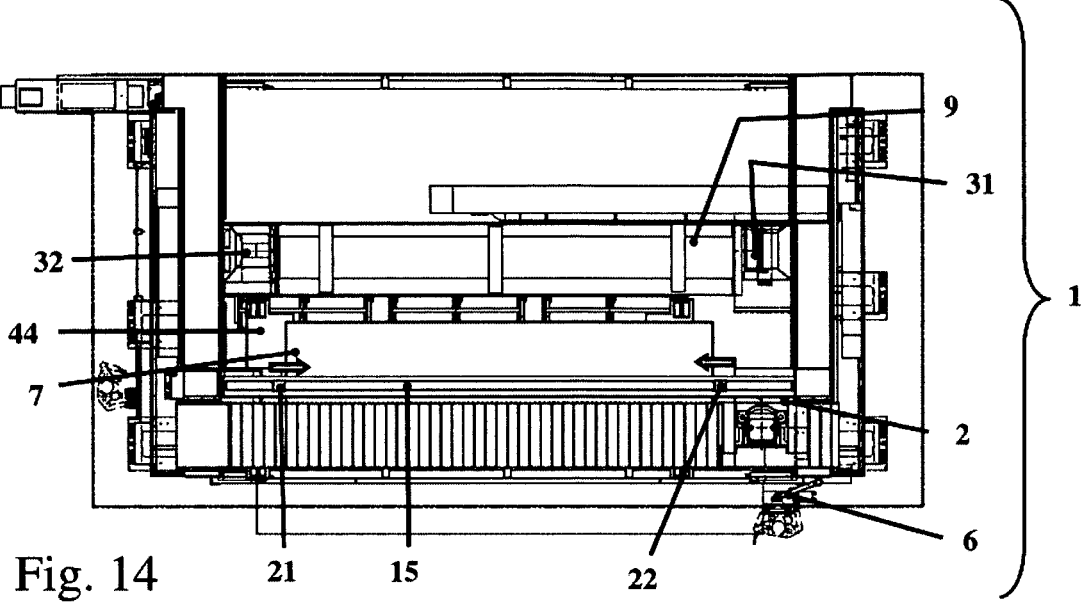
Figure 15:
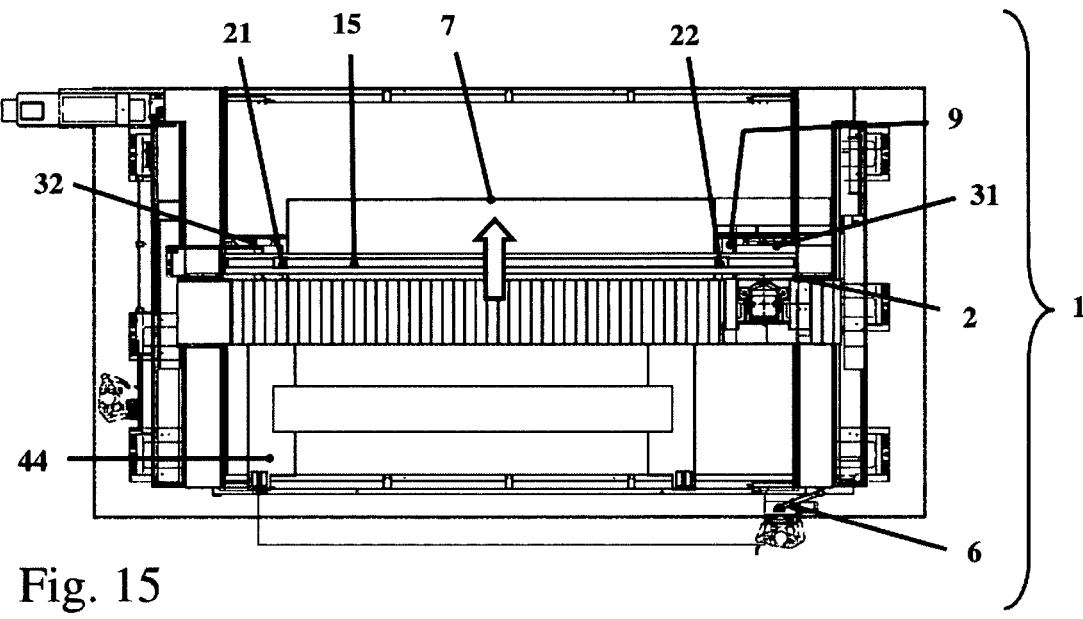
Figure 16:
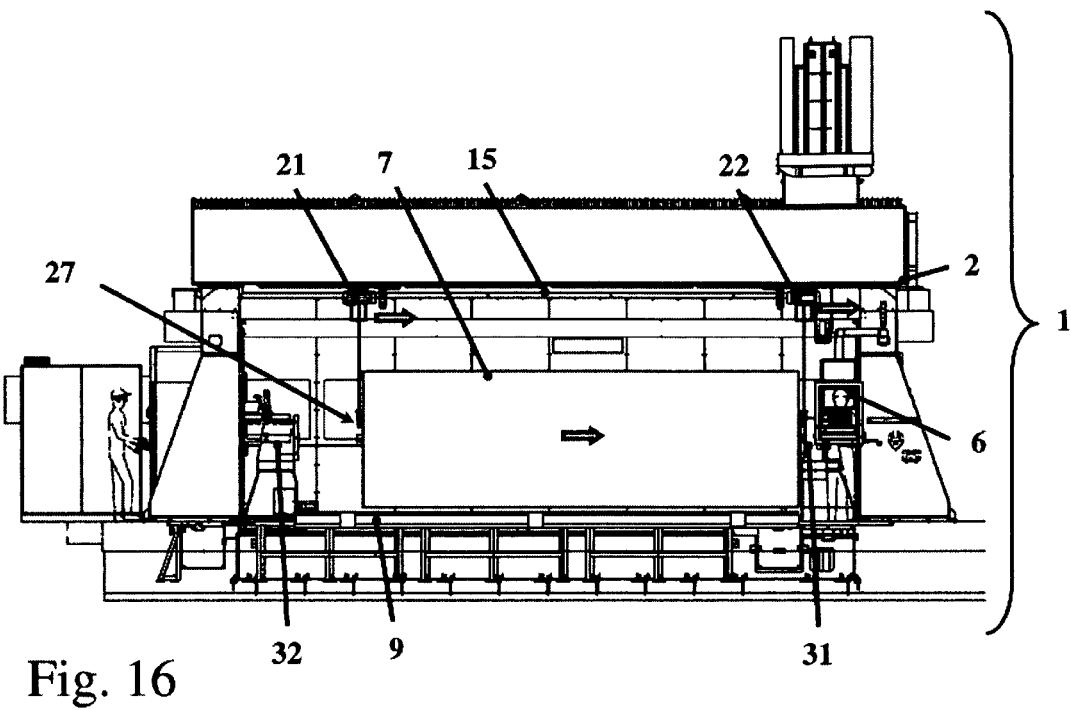
Figure 17:
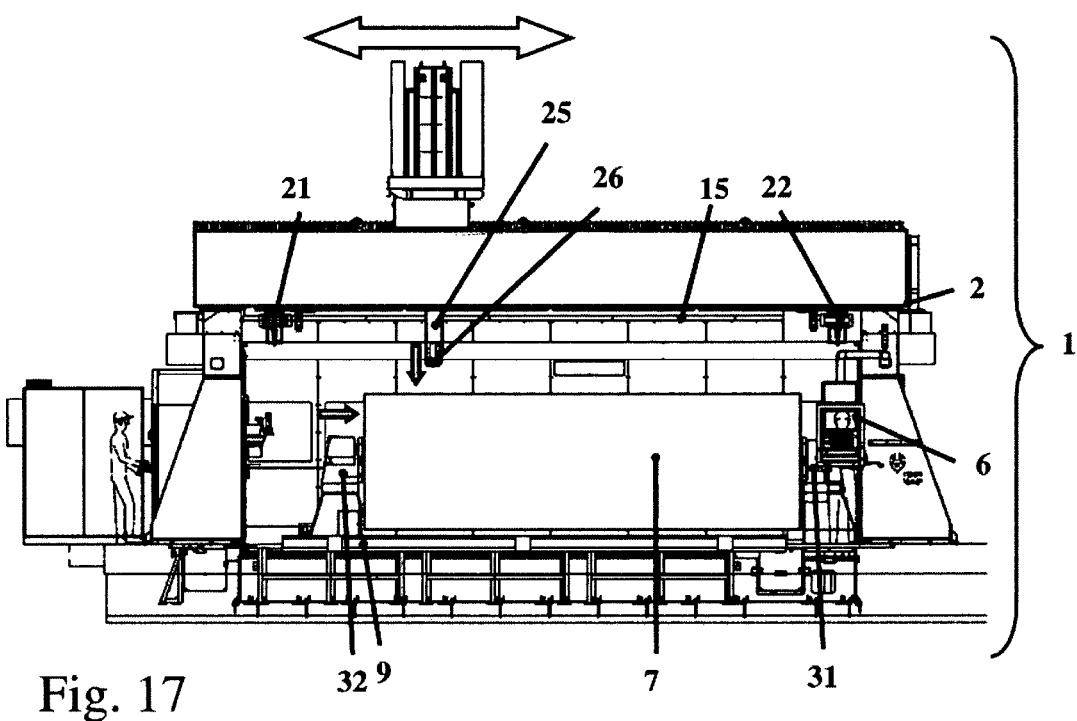

The processing machine (1) is equipped (FIG. 4, FIG. 6) with a movement device (2) of the machining head (26), which consists of a movement bridge (13) according to a movement direction corresponding to the Y axis (37) of the machine and of a sliding system (14), along which the bridge (13) is moved along the direction of the Y axis (37), for the whole longitudinal extension of the processing machine (1). The bridge (13) is equipped with a first motorized drive, by means of which the bridge (13) can move between first zone (41), second zone (42) and third zone (43), which are placed one after the other along the longitudinal direction of the processing machine corresponding to the Y axis (37). The bridge (13) has a width equal to the transverse extension, along an X axis (38) direction orthogonal to the Y axis (37), according to a configuration in which the transverse extension of first zone (41), second zone (42) and third zone (43) is contained within the across development of the bridge (13). The bridge (13) includes (FIG. 4, FIG. 5, FIG. 10, FIG. 11) an arm (25) supporting the machining head (26). The arm (25) is equipped with a second motorized drive, by means of which the arm (25) can transversely move along the direction of the X axis (38) along the transverse extension of the bridge (13). Furthermore, the arm (25) is equipped with a third motorized drive, by means of which the arm (25) can vertically lift and lower the machining head (26) in a direction of a Z axis (39), which is orthogonal to the X axis (38) and the Y axis (37), defining a tern of cartesian axes orthogonal to one another. In the shown embodiment the arm (25) is vertically movable among inward positions within the machine (FIG. 10, FIG. 11) that are the machining positions and an extracted end position (FIG. 3), in which the arm (25) protrudes outwardly and on the upper part of the machine body (5) and the machining head (26) is in a upper end limit wherein it does not hamper the free movement operations of the bridge (13).

A control unit (6), preferably of the numerically controlled type, controls the longitudinal movements of the bridge (13) along the Y axis (37), the transverse movements of the arm (25) along the X axis (38) and the movements along the Z axis (39) of the machining head (26).

In this respect the control unit (6) can position the machining head (26) in any point of spatial coordinates (X, Y) on the plane X-Y of the processing machine (1), defined by the cartesian axes X axis (38) and Y axis (37) by means of the longitudinal movement of the bridge (13) along the Y axis (37) and by means of the longitudinal movement of the arm (25) along the X axis (38). Furthermore, the control unit (6), for each point of spatial coordinates (X, Y), can position the machining head (26) vertically in any point along a spatial coordinate (Z) on the Z axis (39) of the processing machine (1), by means of the lifting and lowering movement of the machining head (26) supported by the arm (25).

The machining head (26) is, in turn, an articulated head suitable for independently moving on X, Y, Z axes a machining tool supported on the head itself. The processing machine (1) includes (FIG. 2, FIG. 4, FIG. 6, FIG. 11) a tool changer device (36). For changing the tools, the control unit (6) will control the movements of the bridge (13), of the arm (25) and of the machining head (26) in such a way to position the machining head (26) in a proximity condition with respect to the tool changer device (36), which is placed near a tool magazine.

As explained, there are considerable problems related to the machining machines of the prior art regarding charging and discharging operations of large-sized elements to be machined. As a non-limiting example for the purposes of the present invention, in case of tubular elements with diameters of about 1000-2000 mm, length between 800 and 6500 mm, weights can also reach to 2000 kg. The elements to be machined with the inventive machine can be in the form of plates or, in general, elements with polygonal or circular section internally hollow or full, having very big and great length sectional sizes. Charging and discharging phases of the machine by means of specifically equipped bridge cranes or forklifts are therefore complex, slow and may also involve the risk of damaging the same elements to be machined and the machine or parts of it. Furthermore, in order to allow the movement by means of such systems, the machine must be opportunely sized to allow the access by means of bridge cranes or by means of forklifts equipped with bulky lifting systems and which must perform the required access manoeuvres, with the consequence that the machines of the prior art must be very big, with an increase in the costs, increase in the occupied space in the production plant, greater difficulty in containing the machining dust, difficulty in obtaining high machining precision because of the constructive tolerances in large machines.

The inventive processing machine (1) includes the use (FIG. 5, FIG. 10, FIG. 11) of a positioning device (10) integrated in the processing machine (1) itself. Advantageously (FIG. 5, FIG. 6, FIG. 7, FIG. 8, FIG. 9, FIG. 10, FIG. 11), the positioning device (10) has been conceived in such a way to allow the execution of charging operations of the element to be machined (7) in automatic or semi-automatic mode and this system is able to carry out the charging in a precise and fast way, reducing the risks of impacts between the element to be machined (7) and parts of the machine on which the charging is carried out in order to perform the machining operations.

The positioning device (10) includes (FIG. 5, FIG. 10, FIG. 11) a mounting structure (45) for fixing to the bridge (13), but it will be evident to an expert skilled in the art that the positioning device (10) may also be arranged directly on bridge (13), without a specific mounting structure (45) integrating the relative components forming the positioning device (10) in the structure of the bridge (13) itself. For example, the mounting structure (45) can be a mounting metal beam or a mounting metal rod. Regardless of how the positioning device (10) is fixed to the bridge (13), that is, both in case of separated device applied by means of the mounting structure (45) and in case of integrated device in the bridge itself, the positioning device (10) can be positioned on the bridge in a position selected among: under the bridge position, frontal position with respect to the bridge placed forward towards the second zone (42), back position with respect to the bridge placed backward towards the third zone (43). The components forming the positioning device (10) include, in particular, one or more guides (15), such as, for example, a couple of mutually parallel guides, which are placed in parallel with respect to the previously defined (38), that is, according to a configuration in which the guides (15) transversely extend along the X axis direction (38) along the width development of the bridge (13). On the guides (15) there is a couple of grabbing devices (21, 22) including a first grabbing device (21) and a second grabbing device (22). Each grabbing device can slide independently one from the other, along the guides (15) and is equipped (FIG. 7, FIG. 8, FIG. 9) with a respective motor (19) coupled to a corresponding gear unit (20) for the movement along the guides, under control of the control unit (6) of the processing machine (1). In particular (FIG. 7, FIG. 8, FIG. 9), each grabbing device (21, 22) includes a plate (17) equipped with carriages (18) for sliding on the guides (15). On the plate the gear-motor group (19, 20) is fixed for the movement. For example, the movement can happen by means of a system having teeth transmitting the motion, comprising a rack (16) placed parallel to the guides (15) and engagement interface (23), converting the rotary motion of the gear-motor group (19, 20) into a linear motion of the grabbing device (21, 22) along the rack (16), under the guiding action given from the coupling between the carriages (18) and the guides (15). It will be evident for a person skilled in the art, that the engagement interface (23) can be made according to different known solutions, such as, for example, an engagement toothed pinion, a transmission belt or another motion transmission system of the known type. In the preferred solution of the present invention, the engagement interface (23) is an engagement toothed pinion. Furthermore, the plate (17) supports a motorized lifting device (24) which is suitable for controlling the lowering and the lifting of the hooking system (27) which is located at the end of a hooking system (27) placed at the end of a wrap-around flexible means, such as, for example, a chain or a belt or a cable (28) for lifting weights. For example, the hooking system (27) can be a hook for grabbing eyebolts, a mechanical fixing coupling or other systems known in the technique for hooking a heavy body to be lifted. For example, the lifting device (24) can be selected between a tackle or a winch.

Thanks to this solution, the positioning device (10) uses the already existing movement of the bridge (13) structure along the Y axis direction (37) of the machine and is sufficient for the positioning device (10) to realize the movement along the X axis (38) of the machine by means of the described system comprising the couple of grabbing devices (21, 22) and the lifting and lowering movement along the Z axis (39) of the machine, by means of the described lifting device (24) supported by each grabbing devices (21, 22).

This solution is very advantageous, not only because it is possible to use more movements of the machine to perform different aims, but also because it allows to solve the problems of the prior art in relation to the charging of large-sized elements to be machined causing significant increase in the volume of the machines and reductions in precision performances of the processes carried out. Specifically, the movement along the Y axis (37) of the positioning device (10) uses the movement along said axis made by the bridge (13) for the movement of the machining head (26), simplifying the overall system, so as be able to achieve the described advantages and to obtain a compact processing machine able to process elements (7) of significant sizes.

In one embodiment, the guides (15) of the positioning device (10) can be used both for the movement of the grabbing devices (21, 22) of the positioning device (10) and for the movement of the arm (25) supporting the machining head (26).

Taking into consideration now an example (FIG. 12, FIG. 13, FIG. 14, FIG. 15, FIG. 16, FIG. 17) of the charging movement of an element to be machined (7), the charging occurs according to the following steps:

loading phase (FIG. 12) of the element to be machined (7) inside the chamber (35) of the processing machine (1) by means of transport means (44) of the element to be machined;

movement phase (FIG. 13) of the movement device (2) from a waiting position to a pickup position of the element to be machined (7);

movement phase (FIG. 13) of the positioning device (10) from a waiting position to a hooking position of the element to be machined (7);

movement phase (FIG. 14) of the positioning device (10) from a waiting position to a grabbing position of the element to be machined (7);

hooking and lifting phase of the element to be machined (7) by means of the hooking system of the positioning device (10). In this phase, the control unit (6) controls the first grabbing device (21) and the second grabbing device (22) in such a way that they simultaneously move during the lifting of the element to be machined;

transport phase (FIG. 15) of the element to be machined (7) from the loading position towards the machining bench (9);

positioning phase of the element to be machined (7) in such a way that a first end of the element to be machined (7) enters in contact with the first support (31) of the bench (9). In this phase, the control unit (6) controls the first grabbing device (21) and the second grabbing device (22), in such a way that they simultaneously move during the movement of the element to be machined;

blocking phase (FIG. 16) of a first end of the element to be machined (7) near the first support (31) of the machining bench (9) with activation of the coupling system with automatic centring and locking of the first support (31);

blocking phase (FIG. 17) of a second end of the element to be machined (7) near the second support (32) of the machining bench (9), by means of approach movement of the second support (32) towards the first support (31), with activation of the coupling system with automatic centring and locking of the second support (32);

release phase (FIG. 17) of the element to be machined (7) from the hooking system of the positioning device (10).

At this point (FIG. 17), there is the machining phase in which the bridge (13) is moved in order to bring the arm (25) in the provided machining position and the arm lowers the head (26) to bring it near the surface to be machined of the element to be machined (7). Specifically, during the transport phases of the element to be machined it is provided that the arm (25) is in a position of maximum lifting and of maximum side excursion, in which the machining head (26) is protected by possible impacts.

In general, the operating method of a processing machine (1) of components (7, 47) relates to a machine (1) comprising a body (5) within which a chamber (35) and a movement bridge (13) which is movable on the upper part of the chamber (35) along an Y axis (37) are present, the bridge (13) being provided with an arm (25) which is movable along the bridge (13) according to a X axis (38), the arm (25) bearing a machining head (26) which is vertically movable on the arm (25) along a Z axis (39), the head (26) being provided with machining tools of the components (7, 47), the machine (1) comprising a first zone (41) for machining, in which a bench (9) is located which includes supports (31, 32) to support at reciprocally opposite ends one of the components (7, 47) which is shaped as an oblong element to be machined (7), wherein the supports (31, 32) support the element to be machined (7). In some embodiments, the supports (31, 32) can be configured in such a way to form a lathe for rotation of the element to be machined (7). With the term oblong, it is intended to indicate an element having a greater length than the sectional sizes. The machine (1) includes a control unit (6) containing machining programs for the control of the movement of bridge (13), arm (25) and head (26). In particular, the method includes a loading phase of the element to be machined (7) inside the chamber (35) of the processing machine (1) in a loading zone by means of transport means (44) of the element to be machined;

a charging phase of the element to be machined (7) on the bench (9);

a machining phase of the element to be machined (7) on the bench (9) by means of movement phases of the bridge (13), of the arm (25) and of the machining head (26) in the first zone (41) for machining;

a discharging phase of the element to be machined (7) from the bench (9);

an unloading phase of the element to be machined (7) from the chamber (35) of the processing machine (1).

The charging phase of the element to be machined (7) on the bench (9) is an automatic or semi-automatic charging phase including:

a movement phase of the movement device (2) along the Y axis (37) from a waiting position to a pickup position for charging the element to be machined (7) in the second zone (42) for charging;

a movement phase of the positioning device (10) along the X axis (38) from a waiting position to a pickup position of the element to be machined (7);

a hooking and lifting phase of the element to be machined (7) by means of the hooking system of the positioning device (10);

a transportation phase of the element to be machined (7) from the loading position in the second zone (42) of charging towards the machining bench (9) in the first zone (41) for machining, by movement means of the movement device (2) along the Y axis (37);

a blocking phase of the element to be machined (7), near the supports (31, 32) of the machining bench (9);

a release phase of the element to be machined (7) from the hooking system of the positioning device (10);

in which the semi-automatic or automatic charging phase is carried out in such a way that the charging movements along the Y axis (37) are made by means of movement of the bridge (13) and along the X axis (38) are made by means of movement of the positioning device (10) integrated to the bridge (13).

Likewise, with reference to the discharging phase, it includes:

a movement phase of the movement device (2) along the Y axis (37) from a waiting position to a pickup position for discharging the element to be machined (7);

a movement phase of the device of positioning (10) along the axis X (38) from a waiting position to a pickup position for discharging the element to be machined (7);

a hooking and lifting phase of the element to be machined (7) by means of the hooking system of the positioning device (10).

a transportation phase of the element to be machined (7) from the position on the machining bench (9) towards an unloading position, by means of movement of the movement device (2) along the Y axis (37);

a lowering phase of the element to be machined (7) on transport means (44) of the element to be machined;

a release phase of the element to be machined (7) from the hooking system of the positioning device (10);

in which the automatic or semi-automatic discharging phase of the element to be machined (7) with respect to the bench (9) is carried out in such a way that the movements along the Y axis (37) are made by means of movement of the bridge (13) and along the X axis (38) are made by means of movement of the positioning device (10) integrated to the bridge (13).

In a preferred embodiment of the method, the processing machine (1) is equipped with grabbing devices (21, 22) including the first grabbing device (21) and the second grabbing device (22) independently sliding along the guides (15) one another, the movement phase of the positioning device (10) along the X axis (38) being a movement phase of first grabbing device (21) and second grabbing device (22) along the guides (15) that transversely extend along the direction of the X axis (38) along the development of the width of the bridge (13), according to a configuration in which the first grabbing device (21) and the second grabbing device (22) are slidable along the guides (15) independently one another.

With reference (FIG. 19) to the embodiment of the pass-through processing machine (1), with an unloading zone of the element to be machined, placed at the opposite side with respect to the charging one, with respect to the machining zone, the method can further comprise an unloading phase of the element to be machined (7) when machining is ended, in which the unloading phase occurs in the third zone (43) of the machine (1), the first zone (41) for machining and the second zone (42) and the third zone (43) transversely developing along the X axis (38) of the machine and being placed one after the other along the Y axis (37) of the machine according to a configuration, in which the first zone (41) for machining is placed between the second zone (42) and the third zone (43), the third zone (43) constituting an unloading zone of the element to be machined for unloading the element to be machined (7) from the machine (1), the second zone (42) for charging and the third zone (43)

for unloading being placed on opposite sides with respect to the first zone (41) for machining in such a way that the machine (1) constitutes a pass-through machine for loading the elements to be machined (7) on one side and unloading the elements to be machined (7) at the opposite side with respect to the loading side.

Preferably, the lifting phase of the element to be machined (7) is a phase for controlling the device of the motorized lifting device (24) of each grabbing device (21, 22) in such a way that the lifting device (24) of the first grabbing device (21) and the lifting device (24) of the second grabbing device (22) are simultaneously moved in a synchronized way during the lifting of the element to be machined, under control of the control unit (6).

In a particularly advantageous embodiment, it is provided that the processing machine (1) is equipped with a pit (3) located below the bench (9) and that the base (8) is equipped with a lifting and lowering system of the bench (9) for the movement of the bench (9) between a position at least partially retracted inside the pit (3) and an extracted position from the pit (3), in which the bench (9) is in the machining condition by means of the machining head (26). This solution allows, together with the other described measures, to obtain a further improved compactness of the processing machine (1), because, thanks to the lowering of the bench (9) within the pit (3), that is, with the at least partially lowered bench with respect to the ground surface (4), it is not necessary to excessively lift the element to be machined (7) during charging operations and the machine in its whole can be maintained lower and more compact, with the previously described advantages in terms of costs, spaces and machining precision.

Figure 18:
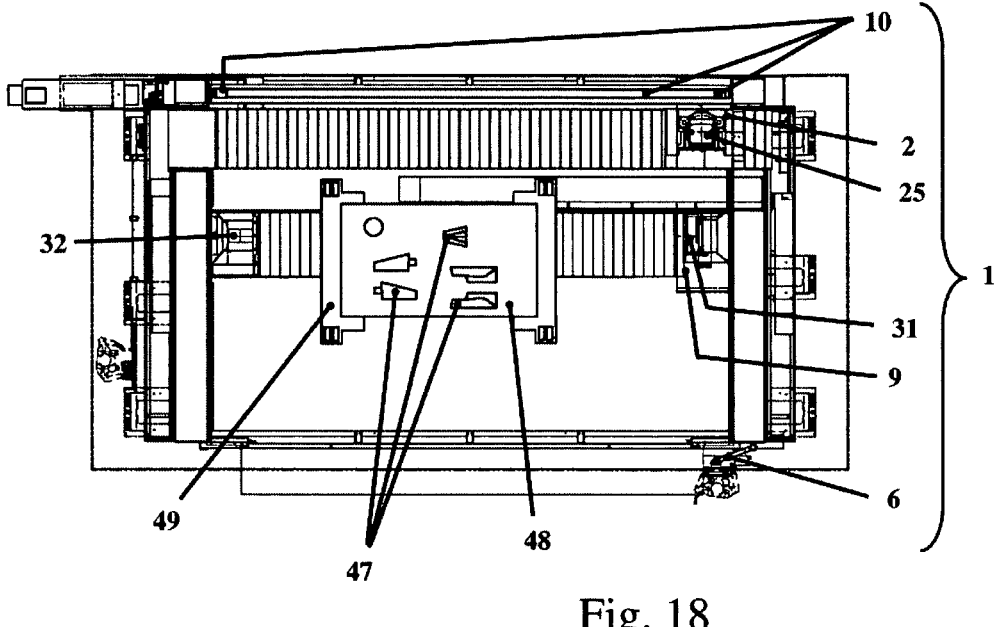
FIG. 18 shows a different form of use of the same inventive machine.

The presence of the pit (3) and of the base (8) equipped with the retractable system of the bench (9), further allows to obtain an additional flexibility of the processing machine (1), because with the retracted bench (9) inside of the pit (3) it is possible (FIG. 18) to operate a retractable cover (46) system of the pit (3), which forms a plane aligned with the ground surface (4). In this way, the entire surface of the chamber (35) of the machine becomes a single walk-over floor of the chamber (35) for further machining operations, on which a movable machining table (48) can be placed, which may be transported, for example, by means of transport means of the table (49), which may be the same transport means of the element to be machined (44) used for the loading and the removal of the element to be machined (7). The movable machining table (48) includes an upper surface for fixing further pieces to be machined (47) having a smaller size than the size of the elements to be machined (7). For example, the further pieces to be machined (47) can be elements to be applied to elements to be machined (7). The elements to be machined (7) can be tubular or cylindrical elements, plates or, in general, elements with polygonal or circular section internally hollow or full, having very big sectional sizes and great length. In these cases, the further pieces to be machined (47) can be pieces that do not require lathe operations made up with the supports (31, 32), but which may be machined or finished by the machining head (26) of the processing machine (1), which, in this way, is highly flexible and not-limited only to the machining operations which can be made by means of turning, with the additional advantage that the plant will be able to use the same machine for very different processing types, avoiding the need to have two different machines.

The inventive solution is particularly advantageous because, thanks to the compactness of the machine and to the fact that it avoids charging operations with bridge crane or forklift, the machine can be sealed more easily, avoiding the dispersion of the machining dust. In fact, since the charging operations with bridge crane from the upper part of the machine are avoided, the first portion of the upper cover (33) and the second portion of the upper cover (34) can always remain in their machining position and avoid the dispersion of the dust upwardly. Said cover portions are foldable and anchored on the opposite sides of the bridge (13), in such a way that, when the bridge (13) is moved along the Y axis direction (37), one of the two upper cover portions extends, while the other retracts respectively under the traction and pushing action of the bridge (13) itself, which is moved. Even the bridge (13) is equipped with a folding cover system which extends and retracts in a similar way further to movements of the arm along the X axis (38).

The elements to be machined (7) can be of different materials, such as, only as a non-limitative example, fiberglass, carbon fibre, metals or metallic alloys including aluminium, wood, etc. Even the processes to be carried out can be of different kinds, such as, only as a non-limitative example, holes, flares, millings, headings, all kinds of operations that can be carried out by a tool supported by the machining head (26), as, for example, a milling tool.

The inventive solution also involves a variation of the usual configurations of similar machines, because the access and the exit of the elements to be machined (7) occurs on the opposite side with respect to the one of the traditional machines. This is due to the particular configuration of the machine, by means of which the charging and discharging operations of the elements to be machined are made by means of the same bridge (13) used for mechanical processes, which does not occur in the prior art techniques. Consequently, the charging operations of the elements to be machined in the inventive machine occur on the same side usually corresponding to the parking position of the machining head, which, during charging and discharging operations by means of the bridge (13), it can be placed in a lifted and side end position in order to be protected by possible risks of impacts. Finally, the present invention relates to (FIG. 1, FIG. 2, FIG. 4, FIG. 5) a processing machine (1) of components (7, 47) comprising a body (5) within which a chamber (35) and a movement bridge (13) which is movable on the upper part of the chamber (35) along an Y axis (37) of the machine are present. The bridge (13) is equipped with a movable arm (25) which is movable along the bridge (13) according to a X axis (38) of the machine and the arm (25) bearing a machining head (26) which is vertically movable on the arm (25) along a Z axis (39) of the machine. The head (26) is equipped with machining tools of the components (7, 47). The machine (1) includes (FIG. 4) a first zone (41) for machining, in which a bench (9) is located which includes (FIG. 5) supports (31, 32) to support at reciprocally opposite ends one of the components (7, 47) which is shaped as an oblong element to be machined (7). The machine (1) includes a control unit (6) containing machining programs for controlling the movement of bridge (13), arm (25) and head (26) to perform machining operations. The processing machine (1) advantageously also includes (FIG. 5, FIG. 7, FIG. 8, FIG. 10, FIG. 11) a positioning device (10) integrated in the structure of the bridge (13), wherein the positioning device (10) includes grabbing devices (21, 22) for the grabbing of the element to be machined (7) and for the transport of the element to be machined (7) from (FIG. 4, FIG. 12, FIG. 13, FIG. 14) a second zone (42) of the machine (1), which is a charging zone of the element to be machined (7), to (FIG. 15) the bench (9), the positioning device (10) being provided with an independent movement system along the X axis (38) and the control unit (6) containing movement programs for controlling the movement of the bridge (13), and of the positioning device (10) for automatic or semi-automatic charging (FIG. 16, FIG. 17) or discharging operations of the element to be machined (7) with respect to the bench (9), in such a way that the charging or discharging movements along the Y axis (37) occur by means of the movement of the bridge (13) and along the X axis (38) occur by means of movement of the positioning device (10). The term independent referred to the movement system along the X axis (38) of the positioning device (10), means that said movement is independent with respect to other movements of the bridge, included the head movements.

The present invention has been described with reference to the figures enclosed in a preferred embodiment thereof, but it is evident that many possible changes, modifications and variants will be readily understood by a person skilled in the art in the light of the previous description. Thus, it should be noted that the present invention is not limited to the present description, but it includes any changes, modifications and variants in compliance with the appended claims.

NOMENCLATURE USED

With reference to the identification numbers in the enclosed figures, the following nomenclature has been used:
1. Processing machine
2. Movement device
3. Pit
4. Ground surface
5. Machine body
6. Control unit
7. Element to be machined
8. Base
9. Bench
10. Positioning device
11. First side
12. Second side
13. Movement bridge
14. Slide system
15. Guide
16. Rack
17. Plate
18. Carriage
19. Motor
20. Gear unit
21. First grabbing device
22. Second grabbing device
23. Engagement interface
24. Lifting device
25. Arm
26. Machining head
27. Hooking system
28. Chain or belt or cable
29. First side cover
30. Second side cover
31. First support
32. Second support
33. First portion of the upper cover
34. Second portion of the upper cover
35. Chamber
36. Tool changer device
37. Y axis direction
38. X axis direction
39. Z axis direction 40. Suction inlet
41. First zone
42. Second zone
43. Third zone
44. Transport mean of the element to be machined
45. Mounting structure
46. Retractable cover
47. Pieces to be machined
48. Machining table
49. Transport means of the machining table

The invention claimed is:

1. A processing machine for machining components, the processing machine comprising:

a movement bridge, a body within which a chamber and the movement bridge are present, the movement bridge being movable on an upper part of the chamber along a Y axis, wherein the movement bridge is provided with an arm which is movable along the bridge along an X axis which extends perpendicular to the Y axis, the arm bearing a machining head which is vertically movable on the arm along a Z axis which extends perpendicular to each of the X axis and the Y axis, the machining head being provided with machining tools for the machining of the components, the processing machine further comprising a first zone in which the machining of the components occurs, wherein the first zone is located inside chamber, and wherein a bench is located in the first zone and the bench includes supports to support at opposite ends thereof one of the components which is shaped as an oblong element to be machined, the processing machine further comprising a control unit containing machining programs for controlling movement of the movement bridge, the arm, and the machining head, the processing machine further comprising a positioning device for grabbing of the oblong element to be machined and for transportation of the element to be machined from a second zone of the processing machine, the second zone being a charging zone of the element to be machined to the bench, wherein the positioning device is fixed to the structure of the movement bridge, and the positioning device is provided with an independent movement system along the X axis, wherein the control unit contains movement programs for controlling the movement of the movement bridge and for controlling movement of the positioning device for automatic or semi-automatic charging or discharging operations of the element to be machined with respect to the bench, in such a way that charging or discharging movements along the Y axis occur by means of the movement of the movement bridge and along the X axis occur by means of movement of the positioning device, wherein the positioning device comprises a plurality of grabbing devices, each of which is equipped with a respective lift device and a respective hook system for hooking, lowering, and lifting of the element to be machined, wherein the plurality of grabbing devices of the positioning device comprises a first grabbing device and a second grabbing device, and wherein the positioning device further comprises guides, the guides transversely extending along the X axis on the movement bridge, the first grabbing device and the second grabbing device being slidable along the guides independently of one another.

2. The processing machine according to claim 1, wherein each of the plurality of grabbing devices is provided with a respective gear-motor group for the movement along the guides under the control of the control unit of the processing machine.

3. The processing machine according to claim 2, wherein the positioning device is further provided with a rack which is placed parallel to the guides and an engagement interface for conversion of rotary motion of each respective gear-motor group into a linear motion of the corresponding one of the plurality of grabbing devices along the rack.

4. The processing machine according to claim 1, wherein each of the plurality of grabbing devices includes a respective plate provided with carriages for sliding on the guides.

5. The processing machine according to claim 4, wherein the respective plate of each of the plurality of grabbing devices supports the lift device corresponding to the grabbing device to which the respective plate is provided, wherein the lift device is motorized and suitable for controlling the lowering and the lifting of the corresponding hook system which is located at the end of a wrap-around flexible means for lowering and lifting the element to be machined.

6. The processing machine according to claim 5, wherein the lift device is selected from a group consisting of; a lift device in the form of a hoist; and a lift device in the form of a winch.

7. The processing machine according to claim 1, wherein the positioning device is a separate device with respect to the movement bridge, the positioning device comprising a mount for fixing the positioning device to the movement bridge.

8. The processing machine according to claim 1, wherein the positioning device is an integrated device with respect to the movement bridge, the components of the positioning device being directly fixed on the structure of the movement bridge.

9. The processing machine according to claim 1, wherein the guides of the positioning device form a guide system both for the movement of the plurality of grabbing devices and for the movement of the arm bearing the machining head.

10. The processing machine according to claim 1, wherein the second zone of the processing machine is further a zone of discharging of the element to be machined from the processing machine.

11. The processing machine according to claim 10, wherein the processing machine further comprises a third zone which is a parking zone of the machining head, and the first zone, the second zone, and the parking zone transversely extend along the X axis of the processing machine, and are placed one after the other according to a configuration, in which the first zone is placed between the second zone and the parking zone along the Y axis of the processing machine.

12. The processing machine according to claim 1, wherein the processing machine further comprises a third zone, the first zone, the second zone, and the third zone transversely extend along the X axis of the processing machine, and are placed one after the other according to a configuration, in which the first zone is placed between the second zone and the third zone along the Y axis of the processing machine, and the third zone constituting an unloading zone for unloading of the element to be machined from the processing machine, the second zone for charging and the third zone for unloading being placed at opposite sides with respect to the first zone, in such a way that the processing machine constitutes a pass-through machine for loading the element to be machined from a loading side and for unloading the element to be machined from an opposite side with respect to the loading side.

13. The processing machine according to claim 1, wherein the supports of the bench form a lathe for rotation of the element to be machined.

14. The processing machine according to claim 1, wherein the supports of the bench include a coupler system with automatic centering and locking for engagement of the element to be machined.

15. The processing machine according to claim 1, wherein the supports of the bench comprise a first support and a second support, at least one of the supports selected between the first support and the second support, being transversely movable along a width axis of the bench according to an approach or departing direction with respect to the other of the two supports, in order to allow an increase of space between the first support and the second support during positioning and removal operations of the element to be machined and in order to allow a decrease of the space with locking action of the element to be machined in a provided position of machining on the bench.

16. The processing machine according to claim 15, wherein the second support is transversely movable along the width axis of the bench and the first support is fixed.

17. The processing machine according to claim 1, wherein the processing machine further comprises a pit which is located below the bench, the bench being supported by a base, the base including a lift system for movement of the bench between a position at least partially retracted inside the pit and an extracted position from the pit, wherein when in the extracted position, the bench is disposed in a machining condition by means of the machining head.

18. The processing machine according to claim 17, wherein the processing machine further comprises a retractable cover system for the pit, the retractable cover system forming a plane aligned with a surface of the ground, so that an entire surface of the chamber of the processing machine becomes a single walk-over floor of the chamber for further machining operations, when the bench is in the position at least partially retracted inside the pit.

19. The processing machine according to claim 18, wherein the processing machine further comprises a movable machining table which is provided with an upper surface for fixing further components to be machined having a smaller size than a size of the element to be machined, the machining table being movable on transport means of the table for insertion into the chamber when the bench is in the position at least partially retracted inside the pit and when the retractable cover system of the pit forms said walk-over floor which is aligned with the surface of the ground.

20. An operating method of the processing machine according to claim 1, the operating method comprising:

providing the processing machine of claim 1;

a loading phase of the element to be machined inside the chamber of the processing machine;

a charging phase of the element to be machined on the bench, the charging phase being an automatic or semi-automatic charging phase that includes:

a movement phase of the movement bridge along the Y axis from a waiting position of the movement bridge to a pickup position of the movement bridge for charging the element to be machined, and a movement phase of the positioning device along the X axis from a waiting position of the positioning device to a pickup position of the positioning device for charging the element to be machined;

a machining phase of the element to be machined on the bench by means of movement phases of the bridge, of the arm, and of the machining head in the first zone for machining;

a discharging phase of the element to be machined from the bench;

an unloading phase of the element to be machined from the chamber of the processing machine;

a hooking and lifting phase of the element to be machined by means of the hook system of the positioning device;

a transportation phase of the element to be machined from a loading position in the second zone for charging towards the bench in the first zone for machining, by movement of the movement bridge along the Y axis;

a blocking phase of the element to be machined at the supports of the bench;

a release phase of the element to be machined from the hook system of the positioning device;

wherein the semi-automatic or automatic charging phase is carried out in such a way that the charging movements along the Y axis are made by means of movement of the movement bridge and along the X axis by means of movement of the positioning device which is fixed to the structure of the movement bridge, and wherein the movement phase of the positioning device along the X axis is a movement phase of the first grabbing device and of the second grabbing device along the guides that transversely extend along the X axis on the movement bridge, the first grabbing device and the second grabbing device sliding along the guides independently of one another.

21. The operating method according to claim 20, wherein the discharging phase of the element to be machined from the bench is an automatic or semi-automatic discharging phase that includes:

a movement phase of the movement bridge along the Y axis from a waiting position of the movement bridge to a pickup position of the movement bridge for discharging the element to be machined;

a movement phase of the positioning device along the X axis from a waiting position of the positioning device to a pickup position of the positioning device for discharging the element to be machined;

a hooking and lifting phase of the element to be machined by means of the hook system of the positioning device;

a transportation phase of the element to be machined from the position on the machining bench towards an unloading position, by means of movement of the movement bridge along the Y axis;

a lowering phase of the element to be machined;

a release phase of the element to be machined from the hook system of the positioning device;

wherein the automatic or semi-automatic discharging phase of the element to be machined with respect to the bench is carried out in such a way that the movements along the Y axis are made by means of movement of the movement bridge and along the X axis are made by means of movement of the positioning device which is fixed to the structure of the movement bridge.

22. The operating method according to claim 20, wherein each of the plurality of grabbing devices of the processing machine includes:

a respective plate provided with carriages for sliding on the guides, wherein the respective plate of each of the plurality of grabbing devices supports the lift device corresponding to the grabbing device to which the respective plate is provided, wherein the lift device is motorized and suitable for controlling the lowering and the lifting of the corresponding hook system which is located at the end of a wrap-around flexible means for lowering and lifting the element to be machined, wherein the lift device is selected from a group consisting of; a lift device in the form of a hoist; and a lift device in the form of a winch, and wherein the lifting phase of the element to be machined being is a control phase of the motorized lift device of each of the plurality of grabbing devices in such a way that the lift device of the first grabbing device and the lift device of the second grabbing device are simultaneously moved in a synchronized way during the lifting of the element to be machined.

23. The operating method according to claim 20, wherein the supports of the processing machine form a lathe for rotation of the element to be machined, the method further comprising:

an unloading phase of the element to be machined when machining is ended, wherein the unloading phase occurs in a third zone of the processing machine, the first zone, the second zone, and the third zone transversely extend along the X axis of the processing machine, and are placed one after the other along the Y axis of the processing machine according to a configuration, in which the first zone is placed between the second zone and the third zone, the third zone constituting an unloading zone for unloading of the element to be machined from the processing machine, the second zone for charging and the third zone for unloading being placed at opposite sides with respect to the first zone in such a way that the processing machine constitutes a pass-through machine for loading the element to be machined on one side and for unloading the element to be machined at an opposite side with respect to the loading side, in which the loading phase of the machine occurs at the opposite side of the processing machine with respect to the side where the unloading phase occurs.

* * * * *